*(12)* United States Patent
Pabst

(10) Patent No.: US 6,517,050 B1
(45) Date of Patent: Feb. 11, 2003

(54) TWO WAY NON LEAKING FLOW VALVE WITH FULL-OPEN CAPABILITY

(75) Inventor: William V. Pabst, Murfreesboro, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/966,862

(22) Filed: Sep. 28, 2001

(51) Int. Cl.$^7$ .............................................. F16K 31/383
(52) U.S. Cl. ...................................... 251/339; 251/341
(58) Field of Search .................. 251/339, 341

(56) References Cited

U.S. PATENT DOCUMENTS

| | | | | |
|---|---|---|---|---|
| 636,465 | A | * 11/1899 | Sowle et al. | 251/339 |
| 4,437,487 | A | * 3/1984 | Marmon | 251/339 |
| 4,561,633 | A | * 12/1985 | Haiges | 251/339 |
| 4,840,351 | A | * 6/1989 | Lii | 251/339 |
| 4,995,588 | A | * 2/1991 | Nichols | 251/339 |
| 5,390,899 | A | * 2/1995 | Perez | 251/339 |
| 6,126,142 | A | * 10/2000 | Wolf et al. | 251/339 |

OTHER PUBLICATIONS

EDCO USA, Vacuum Latch/Release Assembly, date unknown, pp. 13, 14, 18.

* cited by examiner

*Primary Examiner*—Paul J. Hirsch
(74) *Attorney, Agent, or Firm*—Ellis & Venable P C

(57) ABSTRACT

Disclosed is a two way valve that has a valve chamber having a first valve chamber opening bounded and a fluid flow opening. A chamber shuttle, adapted to travel within the valve chamber, is characterized by a chamber shuttle cavity and has a first chamber shuttle cavity opening and a second chamber shuttle cavity opening. A shuttle-plug that is biased by a force established within the valve closes the chamber shuttle cavity to establish a closed fluid-flow state. The chamber shuttle is also movable against the biasing force thereby resisting the shuttle-plug by a structure fixed relative to the valve chamber and opening the chamber shuttle cavity to establish a second fluid-flow state. A preferred embodiment of the invention is incorporated in a valve construction of components that incorporate aspects of the disclosed invention.

17 Claims, 3 Drawing Sheets

Valve Closed

Valve Open

TWO WAY NON LEAKING FLOW VALVE WITH FULL-OPEN CAPABILITY

FIELD OF THE INVENTION

The present invention is characterized as a fluid flow valve and is particularly useful in the field of vacuum pressure components used with generated vacuum pressure in pick and place applications.

BACKGROUND OF THE INVENTION

Vacuum valves are useful for manipulating a work piece in pick and place applications. An external pressure source is applied to the valve which typically has a suction head attached, the suction head is contacted to the work piece, which is then lifted depending on the porting of vacuum pressure through the valve. Alternate valve designs have evolved to increase the efficiency of the use of vacuum pressure. Two designs include dual flow and tri-flow type valve designs.

Dual flow valves are generally limited to a small fluid flow through an orifice and are preferred in applications when suction heads many not be in sealing contact with the work piece. Because of the small fluid flow rate, dual flow valves will limit vacuum pressure loss to the orifice flow when sealing contact is not met with the work piece. However, the small fluid flow rate limits dual flow valves to applications involving non-porous work pieces.

Try-flow valves are not limited to a small fluid flow orifice flow rate and therefore offer greater utility at the expense of greater complexity. Tri-flow valves generally have a full-open vacuum state that permits the application of the full vacuum potential applied to a valve. Moreover, the inclusion of a flow sensor enables the tri-flow valve to determine when a suction head has not made sealing contact with the work piece and decrease the leakage of the tri-flow valve to the orifice flow rate.

With either of the above discussed dual-flow or tri-flow valve, there is always an inherent leakage if a non-sealing contact is made with the work piece. It would be desirable to eliminate or minimize the orifice flow rate leakage in pick and place applications to conserve vacuum pressure and the energy required to create vacuum pressure. This inherent undesirable characteristic of the above valve designs is further aggravated when an array of dual-flow and/or tri-flow valves are working in parallel off the same vacuum generator.

A further undesirable characteristic of the above valves designs is the necessity to have visual confirmation of contact of the suction head to the work piece prior to turning on the vacuum pressure. In other words, vacuum pressure is ordinarily not applied in a system including the above valve types until there is contact between the suction head and the work piece. It would instead be desirable to enable the valve with the functionality to determine the proper instant to apply vacuum pressure. Such functionality would further enable the saving of vacuum pressure in a pick and place application.

SUMMARY OF THE INVENTION

The present invention is characterized as a two way valve within a housing 20 that has a valve chamber bounded by a valve chamber wall 24 and having a first valve chamber opening bounded by a first valve chamber opening edge 26 and a fluid flow opening bounded by a fluid flow opening edge 27. A chamber shuttle 30, characterized by a chamber shuttle cavity bounded by a chamber shuttle cavity wall 31 and having a first chamber shuttle cavity opening bounded by a first chamber shuttle cavity opening edge 33 and a second the chamber shuttle 30 adapted to travel within the valve chamber, and a second chamber shuttle cavity opening bounded by a second chamber shuttle cavity opening edge 35. A shuttle-plug 40 that is biased by a force 50 against the first chamber shuttle cavity opening edge 33 to establish a closed fluid-flow state, the chamber shuttle 30 movable against the biasing force 50 thereby resisting the shuttle-plug 40 by a structure fixed relative to the valve chamber and opening the chamber shuttle cavity to establish a second fluid-flow state. A preferred embodiment of the invention is incorporated in a valve construction of components that incorporate aspects of the invention described above.

A first objective of the invention is to provide a two way valve with very small leakage and full blow-off capability.

A second objective of the invention is to provide a economically feasible valve construction incorporating aspects of the invention.

DETAILED DESCRIPTION OF THE EMBODIMENT

Figure 1:
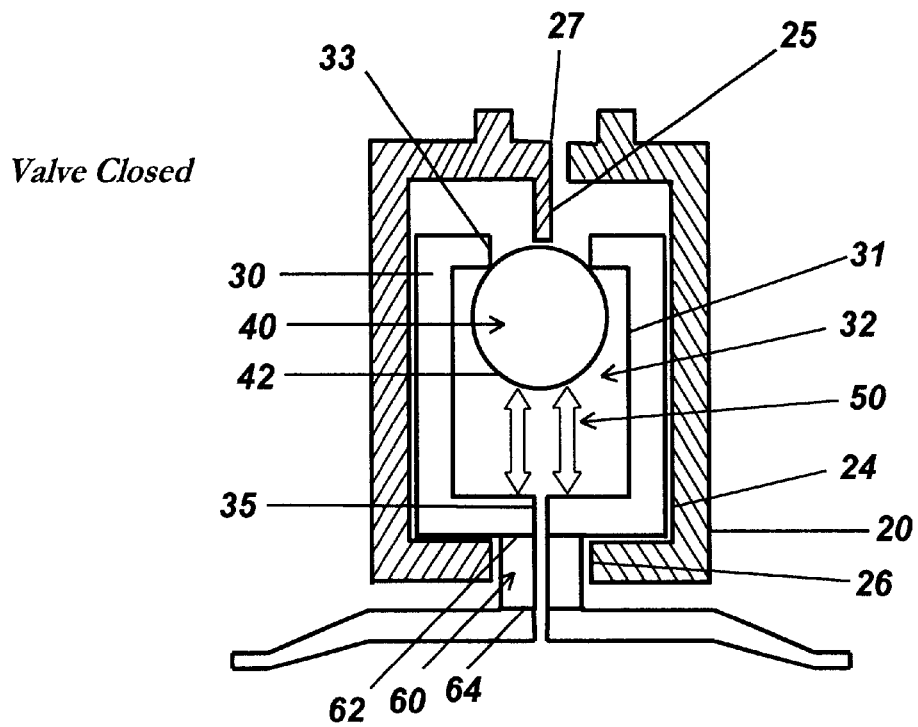
FIG. 1 depicts a cut-away of a first embodiment of the valve closed to fluid-flow.
Figure 2:
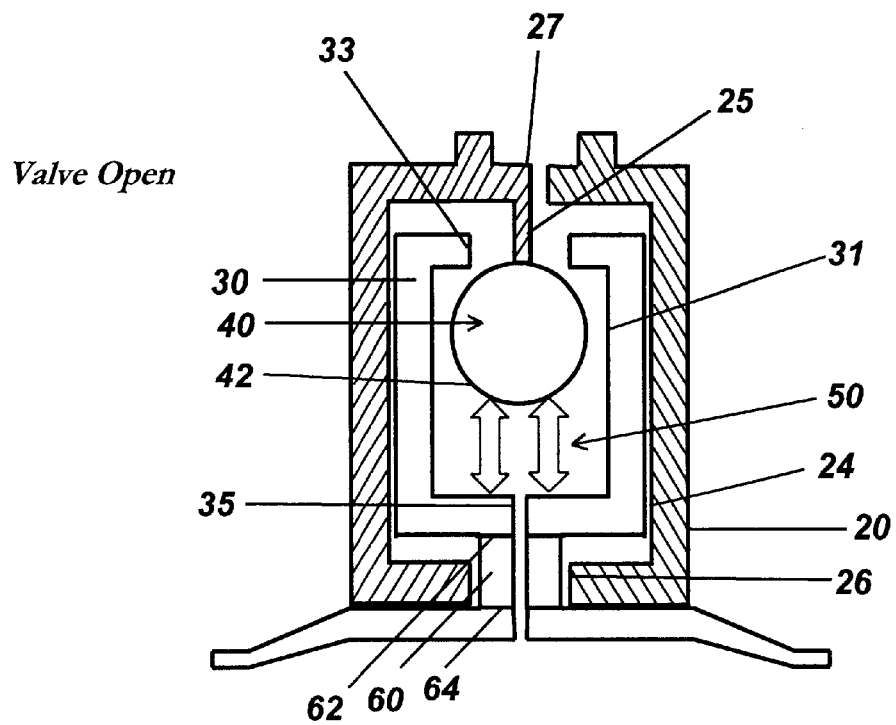
FIG. 2 depicts the cut-away of the first embodiment of the valve open to fluid flow.

A first embodiment of the invention is depicted in FIGS. 1 & 2. A valve housing 20 includes a valve chamber within and is bounded by a valve chamber wall 24. Although a cylindrical valve chamber is preferred, an alternatively shaped valve chamber could be adopted. Fluid-flow negative pressure (i.e. vacuum pressure) is applicable to the valve from the fluid flow opening edge 27 in the valve chamber wall 24. A valve chamber wall protrusion 25 that is fixed, relative to the valve chamber wall 24 projects into the valve chamber. The first valve chamber opening edge 26 bounds the first valve chamber opening.

A chamber shuttle 30 having a cylindrically shaped chamber shuttle cavity is positioned within the valve chamber and adapted to travel within the valve chamber. It is preferred that the outside of the chamber shuttle cavity wall 31 match the shape of inner valve chamber wall 24 to minimize the fluid-flow between the respective walls, 24 and 31. The chamber shuttle 30 has a first chamber shuttle cavity opening bounded by a first chamber shuttle opening positive edge 33. The chamber shuttle 30 has a second chamber shuttle cavity opening bounded by a second chamber shuttle positive edge 35. A chamber shuttle tube 60 is connectable to the second chamber shuttle opening positive edge 35 and at a first chamber shuttle tube end 62. The second chamber shuttle positive edge 35 is accessible through the first valve chamber opening and connectable to a suction head 70 at a second chamber shuttle tube end 62.

A shuttle-plug 40 is positioned within the chamber shuttle cavity and biased by a force 50 applied against a shuttle-plug edge 42 and originating from against the chamber shuttle cavity wall 31. Preferably, the force 50 is applied from a spring 52 positioned between the shuttle-plug edge 42 and the portion of chamber shuttle cavity wall 31 opposite the first positive chamber shuttle edge 33. See FIGS. 1–4. A spring 52 is preferred as it allows fluid-flow through its structure. It is clear that many alternate shapes could be used for the shuttle-plug 40 provided that the shuttle-plug edge 42 matches the chamber shuttle edge 33, however a spherical shaped shuttle-plug 40 is preferred.

The valve has a first state, shown in FIG. 1, wherein the valve is closed. The force 50 applied causes the shuttle-plug edge 42 to contact the first positive chamber shuttle edge 33 thereby prohibiting fluid-flow through the chamber shuttle cavity. The second state of the valve, shown in FIG. 2, permits fluid-flow. The second state of the valve is achieved by an application of a second external force that opposes the force 50 applied to the shuttle-plug 40. The second external force is greater than the force 50 applied to the shuttle-plug edge 42 and moves the chamber shuttle 30, and accordingly the first positive chamber shuttle edge 33 away from the shuttle-plug edge 42 which is instead resisted by the valve chamber wall protrusion 25, thereby opening the chamber shuttle cavity to fluid-flow. The second external force is ordinarily applied by the downward force of the suction head 70 being applied to a work piece to be lifted by negative air pressure applied to the fluid flow opening 27. Blow off, or release, of the lifted work piece is accomplished by increasing the pressure within the valve chamber until the force 50 again causes the shuttle-plug edge 42 to meet and contact the first positive chamber shuttle edge 33 to close the valve, or until the force 50 is overcome by positive air pressure applied through the fluid flow opening edge 27. The first embodiment of the invention includes aspects of the invention. The second embodiment described below includes aspects of the invention is a valve construction that facilitates manufacturing ease and assembly of valve components that include aspects of the invention.

Figure 3:
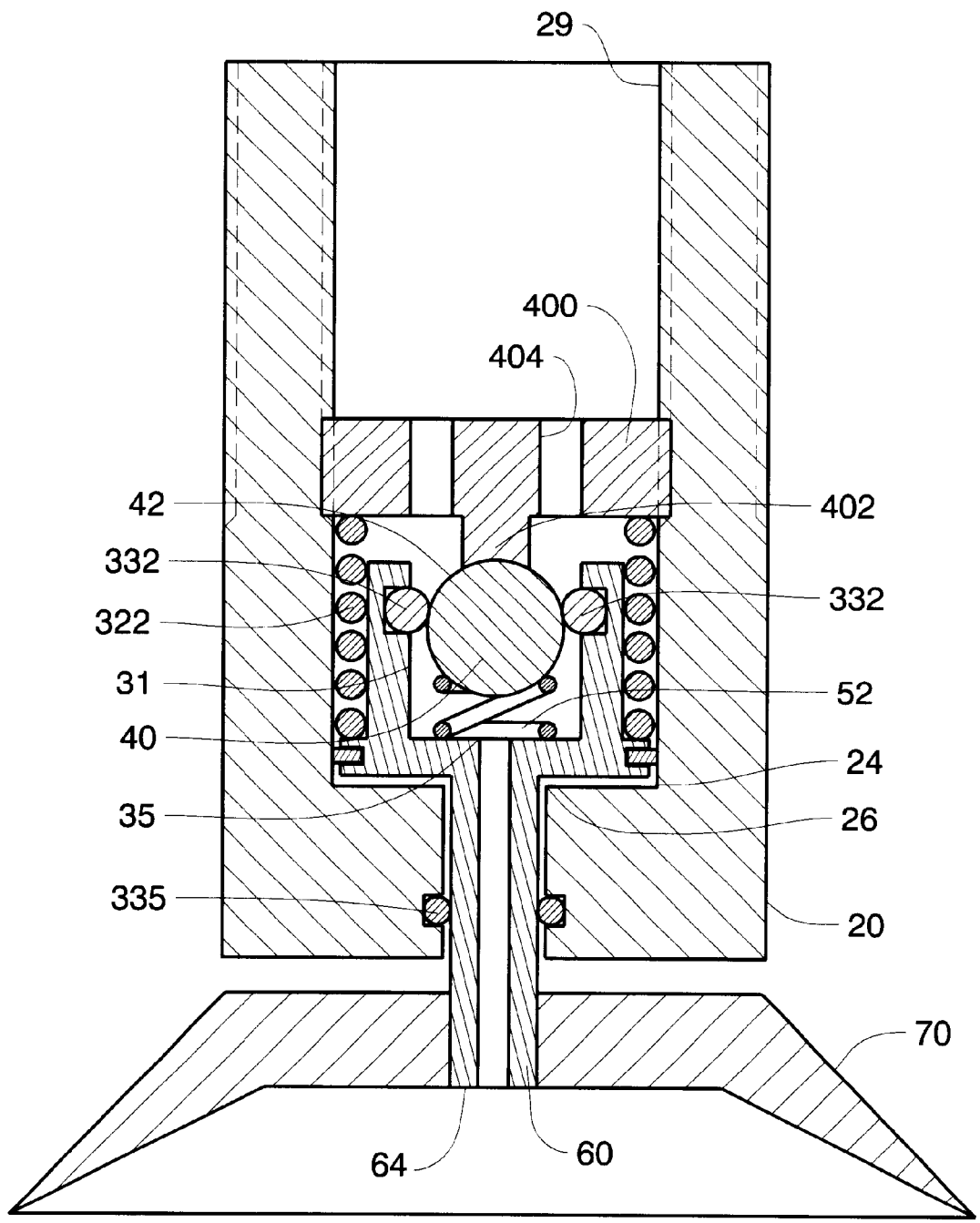
FIG. 3 depicts a valve construction incorporating aspects of the invention closed to fluid flow.
Figure 4:
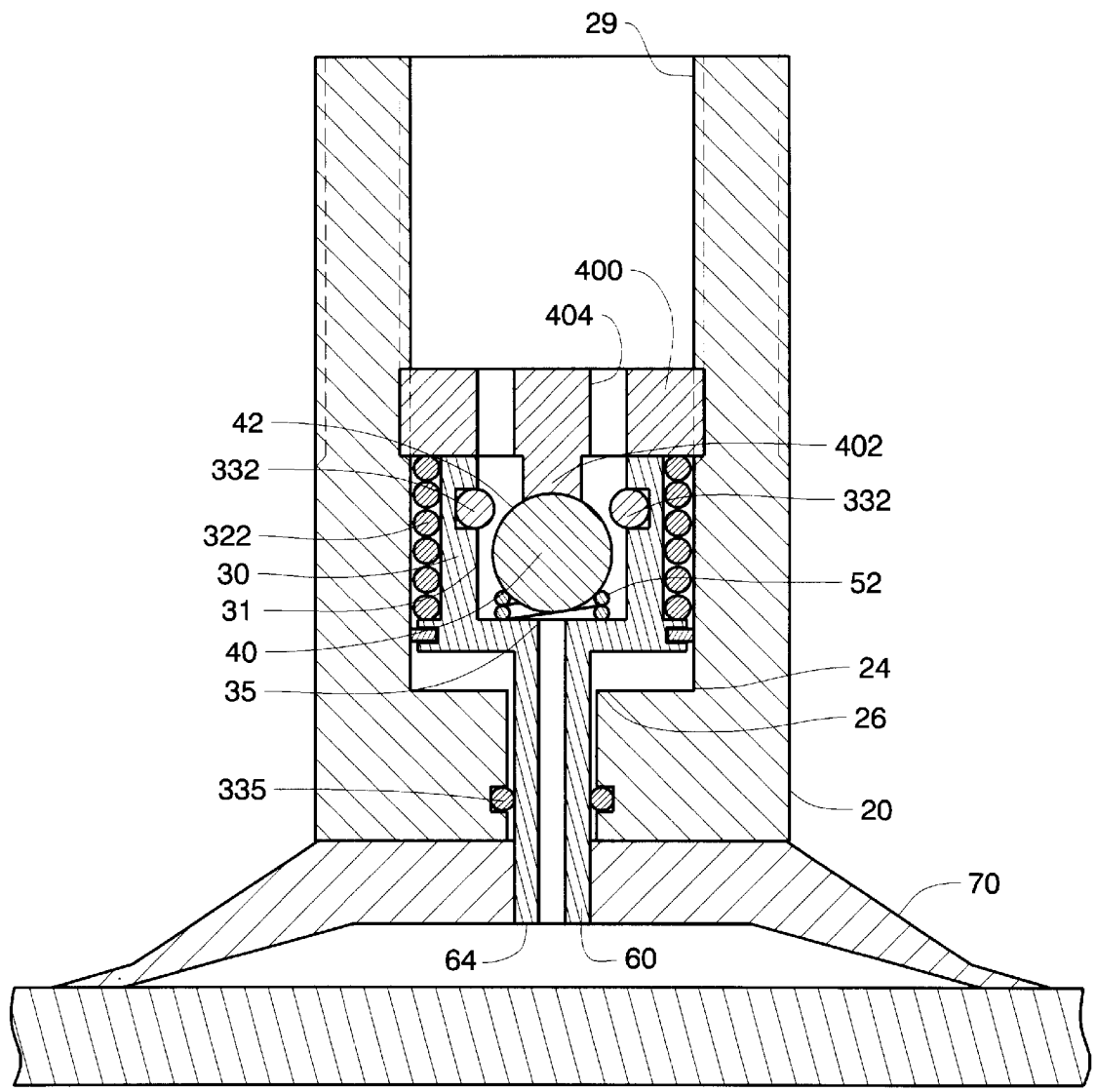
FIG. 4 depicts the valve construction incorporating aspects of the invention open to fluid flow.

The second preferred embodiment of the present invention is a valve construction depicted in FIGS. 3 & 4. A housing 20 for the valve components is characterized by a valve chamber bounded by a valve chamber wall 24. The preferred valve chamber is cylindrical. The valve chamber wall 24 further has a first valve chamber opening bounded by a positive valve chamber edge 26 and a second valve chamber opening bounded by a valve chamber opening edge 29.

A chamber shuttle 30 comprises a chamber shuttle cavity bounded by a chamber shuttle cavity wall 31. The preferred chamber shuttle cavity shape and bounding cavity wall 31 are also cylindrically shaped and fits within the cylindrically shaped valve chamber and snugly against the valve chamber wall 24. The chamber shuttle 30 is sized to travel longitudinally within the cylinder of the valve chamber. At least one rod scraper 322 is included between the outer edge of the chamber shuttle 30 and the valve chamber wall 24 to decrease fluid-flow between the valve chamber wall 24 and the outer edge of the chamber shuttle cavity wall 31. Further, the chamber shuttle cavity wall 31 has a first chamber shuttle cavity opening bounded by a negative chamber shuttle edge 330, and a second chamber shuttle cavity opening bounded by a positive chamber shuttle edge 35, which in the preferred construction, bounds the opening of the chamber shuttle tube 60 and also comprises the first chamber shuttle tube end. A second chamber shuttle tube end 64 is at the other end of the chamber shuffle tube 60 and accessible from outside the valve housing 20 and adapted (e.g. by matched threading) to receive a suction head 70. A chamber shuttle O-Ring 332 is attached to the inner chamber shuttle cavity wall 31 to create a positive chamber shuttle edge by milling a receiving well within the inner chamber shuttle cavity wall 31. Further a chamber shuttle tube O-ring 335 is attached to the first valve chamber opening edge 26 to provide a guide for, and to prevent fluid-flow outside of, the chamber shuttle tube 60.

A shuttle-plug 40 is positioned within the chamber shuttle cavity and biased by a force 50 applied from against the chamber shuffle cavity wall 31. A preferred shuttle-plug 40 has a curved shuttle-plug edge 42 (e.g. spherical as depicted in FIGS. 3 & 4). Moreover, it is preferable to have the force 50 applied from a spring 52 that is biased from against the chamber shuttle cavity wall 31 from a position and direction opposite the first chamber shuttle cavity opening as depicted in FIGS. 3 & 4. Clearly, many alternatives to a spring 52 and the position from where they are biased are numerable and would be obvious to one of ordinary skill in the art. The spring 52 is positioned against the shuttle-plug edge 42 and applies the force 50 that causes the shuttle-plug edge 42 to contact the positive chamber shuttle edge created by a chamber shuttle O-Ring 332 and close the first chamber shuttle cavity opening. In this state, the chamber shuttle cavity is closed to fluid flow.

A valve chamber brace 400, that is fixed relative to the valve chamber wall 24, is adapted to be received within the valve chamber. A preferred valve chamber brace 400 design is preferably disc shaped as depicted. The valve chamber brace 400 may be fixed relative to the valve chamber wall 24 by matching threading on the perimeter of the disc shaped brace 400 to match threading tapped into the valve chamber wall 24. The disc shaped brace 400 may then be screwed into place within the valve chamber. The valve chamber brace 400 further comprises a brace protrusion 402 that is projected into the valve chamber in a direction substantially parallel to the direction of the applied force 50. The valve chamber brace 400 also has at least one fluid flow opening bounded by a fluid flow opening edge 404 that enables fluid-flow between the valve chamber and the chamber shuttle cavity.

The valve construction has a first state, shown in FIG. 3, wherein the valve is closed. The force 50 applied by the spring 52 causes the shuttle-plug edge 42 to contact the chamber shuttle O-Ring 332 thereby prohibiting fluid-flow through the chamber shuttle cavity. The second state of the valve, shown in FIG. 4, permits fluid-flow. The second state of the valve is achieved by an application of a second external force that opposes the force 50 applied to the shuttle-plug 40. The second external force is greater than the force 50 applied to the shuttle-plug edge 42 and moves the chamber shuttle 30, and accordingly the chamber shuttle O-Ring 332 that creates the positive chamber shuttle edge, away from the shuttle-plug edge 42 which is instead resisted by the brace protrusion 402, thereby opening the chamber shuttle cavity to fluid-flow. The second external force is ordinarily applied by the downward force of the suction head 70 being applied to a object to be lifted by negative air pressure applied to the chamber cavity through the fluid flow opening edge 404. Blow off, or release, of the lifted object is accomplished by increasing the pressure within the valve chamber until the force 50 again causes the shuttle-plug edge 42 to meet and contact the first chamber shuttle O-Ring 332 to close the valve, or until the force 50 is overcome by positive air pressure applied through the fluid flow opening edge 404.

Although the invention has been described in detail with reference to particular preferred embodiments, persons possessing ordinary skill in the art to which this invention pertains will appreciate that various modifications and enhancements may be made without departing from the spirit and scope of the claims that follow.

What is claimed is:

1. A valve, comprising:
   a housing having, a valve chamber bounded by a valve chamber wall, a valve chamber opening edge bounding a first valve chamber opening, a valve chamber wall protrusion, and a second valve chamber opening bounded by a fluid flow opening edge in the valve chamber wall;
   a chamber shuttle having, a chamber shuttle cavity bounded by a chamber shuttle cavity wall, a first chamber shuttle opening edge bounding a first chamber shuttle cavity opening, and a second chamber shuttle opening edge bounding a second chamber shuttle cavity opening, the chamber shuttle adapted for travel within the valve chamber in a direction that will enabled contact with the valve chamber wall protrusion;
   a shuttle-plug, positioned within the chamber shuttle cavity and having a shuttle-plug edge that is biased with a force from against the chamber shuttle cavity wall to resist the first chamber shuttle opening edge thereby closing the first chamber shuttle cavity opening, the chamber shuttle movable against the force to disengage the first chamber shuttle opening edge from the shuttle-plug edge thereby opening the first chamber shuttle cavity opening, the shuttle-plug edge resisted instead by the valve chamber wall protrusion.

2. The valve in claim 1 wherein,
   the valve chamber and the chamber shuttle cavity are substantially cylindrically shaped.

3. The valve in claim 1 further comprising,
   a chamber shuttle tube having, a first shuttle tube end bounding the first valve chamber opening, and a second shuttle tube end adapted to receive a suction head.

4. The valve in claim 1 wherein,
   the first valve chamber opening and the first chamber shuttle cavity opening are aligned in a direction longitudinal to the direction of the applied force.

5. The valve in claim 1 wherein,
   the force is applied from a spring positioned biased between the second positive chamber shuttle edge and the shuttle-plug edge.

6. The valve in claim 1 wherein,
   the shuttle plug edge is curved.

7. The valve in claim 1 wherein,
   first chamber shuttle opening edge is a positive edge.

8. The valve in claim 1 wherein,
   the valve chamber opening edge is a positive edge.

9. The valve in claim 1 wherein,
   the chamber shuttle is movable against the force by a second force originating from outside the valve housing.

10. The valve in claim 9 wherein,
    the second force originating from outside the valve housing is applied via a suction head coupled to the chamber shuttle via a chamber shuttle tube.

11. A valve construction comprising:
    a housing having a valve chamber bounded by a valve chamber wall, a negative valve chamber edge bounding a second valve chamber opening, a positive valve chamber edge bounding a first valve chamber opening;
    a valve chamber brace contacting the valve chamber wall and having a brace protrusion projecting into the valve chamber, and a fluid flow opening edge;
    a chamber shuttle adapted to travel within the valve chamber between the positive valve chamber edge and the valve chamber brace, and having a chamber shuttle cavity bounded by a chamber shuttle cavity wall, a first chamber shuttle positive edge bounding a first chamber shuttle cavity opening and a second chamber shuttle edge bounding a second chamber shuttle cavity opening, the second chamber shuttle edge connected to a first chamber shuttle tube end, the second chamber shuttle tube end accessible from outside the first valve chamber opening; and
    a shuttle-plug, within the chamber shuttle cavity between the first positive chamber shuttle edge and the second positive chamber shuttle edge and biased with a force applied from against the chamber shuttle cavity wall to cause the shuttle-plug to resist the first positive chamber shuttle edge thereby closing the first chamber shuttle cavity opening, the chamber shuttle movable against the force to disengage the first positive chamber shuttle edge from the shuttle-plug edge thereby opening the first chamber shuttle cavity opening, the shuttle-plug edge resisted instead by the brace protrusion.

12. The valve construction in claim 11 wherein,
    the valve chamber brace further has threading matching threading on the valve chamber wall.

13. The valve construction in claim 11 wherein,
    the second shuttle tube end is adapted to receive a suction head.

14. The valve construction in claim 11 wherein, the first chamber shuttle positive edge is created by a chamber shuttle O-Ring recessed within a well milled into the inner chamber shuttle cavity wall.

15. The valve construction in claim 11 wherein,
    at least on rod-scrapper is included between the outer chamber shuttle cavity wall and the valve chamber wall.

16. The valve construction in claim 11 wherein,
    an shuttle tube O-Ring recessed within a well milled into the first valve chamber opening edge.

17. A method of operating a valve; the valve comprising a housing having, a valve chamber bounded by a valve chamber wall, a valve chamber opening edge bounding a first valve chamber opening, a valve chamber wall protrusion, and a second valve chamber opening bounded by a fluid flow opening edge in the valve chamber wall; a chamber shuttle having, a chamber shuttle cavity bounded by a chamber shuttle cavity wall, a first chamber shuttle opening edge bounding a first chamber shuttle cavity opening, and a second chamber shuttle opening edge bounding a second chamber shuttle cavity opening, the chamber shuttle adapted for travel within the valve chamber in a direction that will enabled contact with the valve chamber wall protrusion; a shuttle-plug, positioned within the chamber shuttle cavity and having a shuttle-plug edge that is biased with a force from against the chamber shuttle cavity wall to resist the first chamber shuttle opening edge thereby closing the first chamber shuttle cavity opening, the chamber shuttle movable against the force to disengage the first chamber shuttle opening edge from the shuttle-plug edge thereby opening the first chamber shuttle cavity opening, the shuttle-plug edge resisted instead by the valve chamber wall protrusion; the method comprising;

applying negative pressure through the fluid flow opening edge, positioning a suction head coupled to the second chamber shuttle opening edge adjacent to a work piece;

contacting the suction head to the work piece to overcome the force biasing the shuttle plug thereby, displacing the chamber shuttle within the valve chamber to cause fluid-flow through the valve.

* * * * *